US011595925B2

(12) United States Patent
Talarico et al.

(10) Patent No.: US 11,595,925 B2
(45) Date of Patent: Feb. 28, 2023

(54) ENHANCED CELL SEARCH AND SYSTEM INFORMATION ACQUISITION

(71) Applicant: Apple Inc., Cupertino, CA (US)

(72) Inventors: Salvatore Talarico, Sunnyvale, CA (US); Qiaoyang Ye, San Jose, CA (US); Debdeep Chatterjee, San Jose, CA (US); Seunghee Han, San Jose, CA (US); Dae Won Lee, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/397,849

(22) Filed: Aug. 9, 2021

(65) Prior Publication Data

US 2022/0006585 A1 Jan. 6, 2022

Related U.S. Application Data

(63) Continuation of application No. 16/496,363, filed as application No. PCT/US2018/023351 on Mar. 20, 2018, now Pat. No. 11,088,797.
(Continued)

(51) Int. Cl.
*H04W 56/00* (2009.01)
*H04W 4/70* (2018.01)
(Continued)

(52) U.S. Cl.
CPC ..... *H04W 56/0015* (2013.01); *H04J 11/0069* (2013.01); *H04L 5/0048* (2013.01);
(Continued)

(58) Field of Classification Search
CPC . H04L 5/0048; H04L 5/0053; H04L 27/2613; H04L 27/2692; H04W 4/70;
(Continued)

(56) References Cited

U.S. PATENT DOCUMENTS 10,897,295 B2 * 1/2021 Cheng ................. H04J 13/0062
11,088,797 B2 * 8/2021 Talarico ............ H04W 56/0015
(Continued)

OTHER PUBLICATIONS

Sony; "NR synchronization signal configuration and multiplexing"; 3GPP TSG RAN WG1 Meeting #88 R1-1703127; Athens, Greece; Feb. 13, 2017; 4 pages.
(Continued)

*Primary Examiner* — Brian T O'Connor
(74) *Attorney, Agent, or Firm* — Kowert, Hood, Munyon, Rankin & Goetzel, P.C.

(57) ABSTRACT

Embodiments of efeMTC synchronization signals for enhanced cell search and enhanced system information acquisition are described. In some embodiments, an apparatus of a base station (BS) is configured to generate a length-x sequence for an efeMTC synchronization signal, the length-x sequence configured for repetition in frequency domain within 6 physical resource blocks (PRB). In some embodiments, to generate the length-x sequence, the BS may be configured to select any one index of the set of root indices {1, 2, 63}, excluding the root indices 25, 29 and 34, to correspond to a different physical-layer cell identity (PCID). In some embodiments, the BS may be configured to encode RRC signaling to include a System Information Block (SIB) comprising configuration information for transmission of the efeMTC synchronization signal, and transmit the length-x sequence as the efeMTC synchronization signal in frequency resources according to the SIB.

20 Claims, 12 Drawing Sheets

Related U.S. Application Data

(60) Provisional application No. 62/587,657, filed on Nov. 17, 2017, provisional application No. 62/476,574, filed on Mar. 24, 2017.

(51) Int. Cl.
  *H04W 76/27*   (2018.01)
  *H04J 11/00*   (2006.01)
  *H04L 5/00*    (2006.01)
  *H04L 27/26*   (2006.01)

(52) U.S. Cl.
  CPC ........ *H04L 5/0053* (2013.01); *H04L 27/2613* (2013.01); *H04L 27/2692* (2013.01); *H04W 4/70* (2018.02); *H04W 76/27* (2018.02); *H04L 27/26132* (2021.01)

(58) Field of Classification Search
  CPC . H04W 76/27; H04W 56/0015; H04W 48/08; H04J 11/0069
  See application file for complete search history.

(56) References Cited

U.S. PATENT DOCUMENTS

| | | |
|---|---|---|
| 11,343,782 B2 * | 5/2022 | Li .................... H04W 56/0005 |
| 2013/0039268 A1 | 2/2013 | Blankenship et al. |
| 2014/0204809 A1 | 7/2014 | Kim et al. |
| 2015/0372851 A1 | 12/2015 | Kakishima et al. |

OTHER PUBLICATIONS

Samsung; "SS Sequence Design" 3GPP TSG-RAN WG1 Meeting #88 R1-1702904; Athens, Greece; Feb. 13, 2017; 6 pages.

Nasraoui Leila et al: "Performance Analysis of Low-Complexity Simply-Differential Time Synchronization Approach for MTC over LTE Systems", 2016 IEEE 84th Vehicular Technology Conference (VTC-FALL), IEEE, Sep. 18, 2016, 5 Pages, XP033078977.

Extended Search Report for Patent Application No. EP18771638; dated Oct. 15, 2020; 8 Pages.

"International Application Serial No. PCT/US2018/023351, International Search Report dated Jul. 5, 2018", 3 pgs.

"International Application Serial No. PCT/US2018/023351, Written Opinion dated Jul. 5, 2018", 9 pgs.

\* cited by examiner

FIG. 6

| $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ | $N_{ID}^{(1)}$ | $m_0$ | $m_1$ |
|---|---|---|---|---|---|---|---|---|---|---|---|---|---|---|
| 0 | 0 | 1 | 34 | 4 | 6 | 68 | 9 | 12 | 102 | 15 | 19 | 136 | 22 | 27 |
| 1 | 1 | 2 | 35 | 5 | 7 | 69 | 10 | 13 | 103 | 16 | 20 | 137 | 23 | 28 |
| 2 | 2 | 3 | 36 | 6 | 8 | 70 | 11 | 14 | 104 | 17 | 21 | 138 | 24 | 29 |
| 3 | 3 | 4 | 37 | 7 | 9 | 71 | 12 | 15 | 105 | 18 | 22 | 139 | 25 | 30 |
| 4 | 4 | 5 | 38 | 8 | 10 | 72 | 13 | 16 | 106 | 19 | 23 | 140 | 0 | 6 |
| 5 | 5 | 6 | 39 | 9 | 11 | 73 | 14 | 17 | 107 | 20 | 24 | 141 | 1 | 7 |
| 6 | 6 | 7 | 40 | 10 | 12 | 74 | 15 | 18 | 108 | 21 | 25 | 142 | 2 | 8 |
| 7 | 7 | 8 | 41 | 11 | 13 | 75 | 16 | 19 | 109 | 22 | 26 | 143 | 3 | 9 |
| 8 | 8 | 9 | 42 | 12 | 14 | 76 | 17 | 20 | 110 | 23 | 27 | 144 | 4 | 10 |
| 9 | 9 | 10 | 43 | 13 | 15 | 77 | 18 | 21 | 111 | 24 | 28 | 145 | 5 | 11 |
| 10 | 10 | 11 | 44 | 14 | 16 | 78 | 19 | 22 | 112 | 25 | 29 | 146 | 6 | 12 |
| 11 | 11 | 12 | 45 | 15 | 17 | 79 | 20 | 23 | 113 | 26 | 30 | 147 | 7 | 13 |
| 12 | 12 | 13 | 46 | 16 | 18 | 80 | 21 | 24 | 114 | 0 | 5 | 148 | 8 | 14 |
| 13 | 13 | 14 | 47 | 17 | 19 | 81 | 22 | 25 | 115 | 1 | 6 | 149 | 9 | 15 |
| 14 | 14 | 15 | 48 | 18 | 20 | 82 | 23 | 26 | 116 | 2 | 7 | 150 | 10 | 16 |
| 15 | 15 | 16 | 49 | 19 | 21 | 83 | 24 | 27 | 117 | 3 | 8 | 151 | 11 | 17 |
| 16 | 16 | 17 | 50 | 20 | 22 | 84 | 25 | 28 | 118 | 4 | 9 | 152 | 12 | 18 |
| 17 | 17 | 18 | 51 | 21 | 23 | 85 | 26 | 29 | 119 | 5 | 10 | 153 | 13 | 19 |
| 18 | 18 | 19 | 52 | 22 | 24 | 86 | 27 | 30 | 120 | 6 | 11 | 154 | 14 | 20 |
| 19 | 19 | 20 | 53 | 23 | 25 | 87 | 0 | 4 | 121 | 7 | 12 | 155 | 15 | 21 |
| 20 | 20 | 21 | 54 | 24 | 26 | 88 | 1 | 5 | 122 | 8 | 13 | 156 | 16 | 22 |
| 21 | 21 | 22 | 55 | 25 | 27 | 89 | 2 | 6 | 123 | 9 | 14 | 157 | 17 | 23 |
| 22 | 22 | 23 | 56 | 26 | 28 | 90 | 3 | 7 | 124 | 10 | 15 | 158 | 18 | 24 |
| 23 | 23 | 24 | 57 | 27 | 29 | 91 | 4 | 8 | 125 | 11 | 16 | 159 | 19 | 25 |
| 24 | 24 | 25 | 58 | 28 | 30 | 92 | 5 | 9 | 126 | 12 | 17 | 160 | 20 | 26 |
| 25 | 25 | 26 | 59 | 0 | 3 | 93 | 6 | 10 | 127 | 13 | 18 | 161 | 21 | 27 |
| 26 | 26 | 27 | 60 | 1 | 4 | 94 | 7 | 11 | 128 | 14 | 19 | 162 | 22 | 28 |
| 27 | 27 | 28 | 61 | 2 | 5 | 95 | 8 | 12 | 129 | 15 | 20 | 163 | 23 | 29 |
| 28 | 28 | 29 | 62 | 3 | 6 | 96 | 9 | 13 | 130 | 16 | 21 | 164 | 24 | 30 |
| 29 | 29 | 30 | 63 | 4 | 7 | 97 | 10 | 14 | 131 | 17 | 22 | 165 | 0 | 7 |
| 30 | 0 | 2 | 64 | 5 | 8 | 98 | 11 | 15 | 132 | 18 | 23 | 166 | 1 | 8 |
| 31 | 1 | 3 | 65 | 6 | 9 | 99 | 12 | 16 | 133 | 19 | 24 | 167 | 2 | 9 |
| 32 | 2 | 4 | 66 | 7 | 10 | 100 | 13 | 17 | 134 | 20 | 25 | - | - | - |
| 33 | 3 | 5 | 67 | 8 | 11 | 101 | 14 | 18 | 135 | 21 | 26 | - | - | - |

| Root Index | 9 | 21 | 24 | 25 | 29 | 34 | 40 | 44 | 59 |
|---|---|---|---|---|---|---|---|---|---|
| 9 | 1.00 | 0.26 | 0.22 | 0.18 | 0.16 | 0.16 | 0.15 | 0.33 | 0.16 |
| 21 | 0.26 | 1.00 | 0.23 | 0.16 | 0.16 | 0.15 | 0.15 | 0.16 | 0.16 |
| 24 | 0.22 | 0.23 | 1.00 | 0.15 | 0.16 | 0.16 | 0.17 | 0.16 | 0.33 |
| 25 | 0.18 | 0.16 | 0.15 | 1.00 | 0.20 | 0.38 | 0.22 | 0.16 | 0.22 |
| 29 | 0.16 | 0.16 | 0.16 | 0.20 | 1.00 | 0.17 | 0.20 | 0.23 | 0.22 |
| 34 | 0.16 | 0.15 | 0.16 | 0.38 | 0.17 | 1.00 | 0.22 | 0.19 | 0.17 |
| 40 | 0.15 | 0.15 | 0.17 | 0.22 | 0.20 | 0.22 | 1.00 | 0.20 | 0.17 |
| 44 | 0.33 | 0.16 | 0.16 | 0.16 | 0.23 | 0.19 | 0.20 | 1.00 | 0.22 |
| 59 | 0.16 | 0.16 | 0.33 | 0.22 | 0.22 | 0.17 | 0.17 | 0.22 | 1.00 |

FIG. 7

| Root Index | 9 | 21 | 24 | 25 | 29 | 34 | 40 | 44 | 59 |
|---|---|---|---|---|---|---|---|---|---|
| 9 | 1.00 | 0.28 | 0.34 | 0.22 | 0.26 | 0.23 | 0.25 | 0.34 | 0.28 |
| 21 | 0.27 | 0.98 | 0.32 | 0.23 | 0.24 | 0.22 | 0.23 | 0.25 | 0.24 |
| 24 | 0.35 | 0.34 | 1.00 | 0.25 | 0.21 | 0.27 | 0.23 | 0.27 | 0.34 |
| 25 | 0.22 | 0.24 | 0.23 | 1.00 | 0.20 | 0.37 | 0.25 | 0.28 | 0.27 |
| 29 | 0.26 | 0.24 | 0.22 | 0.21 | 1.00 | 0.31 | 0.25 | 0.26 | 0.25 |
| 34 | 0.23 | 0.23 | 0.26 | 0.39 | 0.31 | 1.00 | 0.25 | 0.26 | 0.22 |
| 40 | 0.25 | 0.24 | 0.23 | 0.26 | 0.27 | 0.26 | 1.00 | 0.25 | 0.25 |
| 44 | 0.34 | 0.27 | 0.28 | 0.29 | 0.25 | 0.24 | 0.25 | 1.00 | 0.27 |
| 59 | 0.27 | 0.23 | 0.33 | 0.33 | 0.25 | 0.22 | 0.26 | 0.27 | 1.00 |

FIG. 8

| Root Index | 9 | 21 | 24 | 25 | 29 | 34 | 40 | 44 | 59 |
|---|---|---|---|---|---|---|---|---|---|
| 9 | 0.99 | 0.11 | 0.12 | 0.06 | 0.11 | 0.07 | 0.06 | 0.11 | 0.08 |
| 21 | 0.11 | 1.00 | 0.13 | 0.07 | 0.06 | 0.06 | 0.05 | 0.06 | 0.06 |
| 24 | 0.11 | 0.14 | 0.98 | 0.07 | 0.07 | 0.08 | 0.07 | 0.09 | 0.11 |
| 25 | 0.07 | 0.07 | 0.06 | 0.98 | 0.07 | 0.14 | 0.06 | 0.11 | 0.06 |
| 29 | 0.11 | 0.07 | 0.09 | 0.07 | 0.98 | 0.10 | 0.07 | 0.07 | 0.06 |
| 34 | 0.06 | 0.07 | 0.08 | 0.14 | 0.10 | 0.98 | 0.06 | 0.10 | 0.08 |
| 40 | 0.06 | 0.09 | 0.07 | 0.07 | 0.06 | 0.08 | 0.98 | 0.98 | 0.08 |
| 44 | 0.11 | 0.06 | 0.09 | 0.07 | 0.08 | 0.07 | 0.09 | 0.98 | 0.06 |
| 59 | 0.07 | 0.06 | 0.11 | 0.09 | 0.07 | 0.07 | 0.09 | 0.06 | 0.99 |

FIG. 9

| Rx sequence | 25 | 29 | 34 | 23 | 30 | 33 | 40 |
|---|---|---|---|---|---|---|---|
| 25 | 1.00 | 0.20 | 0.37 | 0.24 | 0.28 | 0.24 | 0.25 |
| 29 | 0.21 | 1.00 | 0.31 | 0.26 | 0.24 | 0.25 | 0.25 |
| 34 | 0.39 | 0.31 | 1.00 | 0.27 | 0.25 | 0.24 | 0.25 |
| 23 | 0.24 | 0.25 | 0.25 | 1.00 | 0.35 | 0.26 | 0.24 |
| 30 | 0.26 | 0.24 | 0.25 | 0.33 | 1.00 | 0.33 | 0.26 |
| 33 | 0.23 | 0.25 | 0.24 | 0.26 | 0.36 | 1.00 | 0.35 |
| 40 | 0.26 | 0.27 | 0.26 | 0.24 | 0.26 | 0.33 | 1.00 |

FIG. 10A

| Rx sequence | 25 | 29 | 34 | 23 | 30 | 33 | 40 |
|---|---|---|---|---|---|---|---|
| 25 | 1.00 | 0.07 | 0.14 | 0.08 | 0.08 | 0.06 | 0.07 |
| 29 | 0.07 | 1.00 | 0.11 | 0.06 | 0.06 | 0.06 | 0.07 |
| 34 | 0.15 | 0.10 | 1.00 | 0.06 | 0.06 | 0.06 | 0.07 |
| 23 | 0.09 | 0.07 | 0.06 | 1.00 | 0.11 | 0.11 | 0.08 |
| 30 | 0.08 | 0.06 | 0.07 | 0.11 | 1.00 | 0.13 | 0.08 |
| 33 | 0.08 | 0.07 | 0.06 | 0.08 | 0.15 | 1.00 | 0.12 |
| 40 | 0.07 | 0.06 | 0.08 | 0.09 | 0.11 | 0.11 | 1.00 |

FIG. 10B

ENHANCED CELL SEARCH AND SYSTEM INFORMATION ACQUISITION

PRIORITY CLAIM

This is a continuation of U.S. patent application Ser. No. 16/496,363, filed Sep. 20, 2019, which is a U.S. National Stage Filing under 35 U.S.C. 371 from International Application No. PCT/US2018/023351, filed Mar. 20, 2018 and published in English as WO 2018/175433 on Sep. 27, 2018, which application claims priority to U.S. Provisional Patent Application Ser. No. 62/476,574 filed, Mar. 24, 2017 and U.S. Provisional Patent Application Ser. No. 62/587,657 filed, Nov. 17, 2017, each of which are incorporated herein by reference in their entirety.

The claims in the instant application are different than those of the parent application and/or other related applications. The Applicant therefore rescinds any disclaimer of claim scope made in the parent application and/or any predecessor application in relation to the instant application. Any such previous disclaimer and the cited references that it was made to avoid, may need to be revisited. Further, any disclaimer made in the instant application should not be read into or against the parent application and/or other related applications.

TECHNICAL FIELD

Embodiments pertain to wireless networks and wireless communications. Some embodiments relate to 3GPP Long Terni Evolution (LTE) networks including LTE-Advanced (LTE-A) networks. Some embodiments relate to 5G networks. Some embodiments relate to Even Further Enhanced Machine-Type Communications (efeMTC) for LTE. Some embodiments relate to methods, computer readable media, and apparatuses for efeMTC synchronization signals, cell search and system information acquisition.

BACKGROUND

Due to the enormous interest in integrating connectivity solutions with sensors, actuators, meters (water, gas, electric, or parking), cars, and appliances, and because of the increasing use cases for development, Machine Type Communication (MTC) or Machine to Machine (M2M) communication is gaining a tremendous interest among mobile network operators, equipment vendors, and research bodies. To facilitate convergence, different standardization groups have been working on this topic within the 3GPP standardization group. MTC for cellular communication was defined by 3GPP based on LIE in Rel-12 and Rel-13.

While low cost has been the major objective of the definition for Rel-12 based specification, in Rel-13 and Rel-14, coverage enhancement of MTC devices has been the major focus along with reduced power consumption, complexity and narrow bandwidth operation.

In parallel with MTC, another enabler of the Internet of Things (IoT) is the narrowband-IoT (NB-IoT). NB-IoT has similar objectives such as coverage extension, UE complexity reduction, long battery lifetime, and backward compatibility with the LTE network. In addition, NB-IoT aims to offer deployment flexibility allowing an operator to introduce NB-IoT using a small portion of its existing available spectrum, and operate in one of a standalone, in-band, or guard-band modality. Further improvements in Release 15 are desirable, for example, to reduce system information acquisition time, and improve performance for a cell search operation.

BRIEF DESCRIPTION OF THE DRAWINGS

FIG. 6 illustrates a table of physical-layer identities and associated indices, in accordance with some embodiments;

FIG. 7 illustrates exemplary cross-correlations of certain sequences, in accordance with some embodiments;

FIG. 8 illustrates exemplary cross-correlations of certain sequences, in accordance with some embodiments;

FIG. 9 illustrates exemplary cross-correlations of certain sequences, in accordance with some embodiments;

FIG. 10A illustrates exemplary cross-correlations of certain sequences, in accordance with some embodiments;

FIG. 10B illustrates exemplary cross-correlations of certain sequences, in accordance with some embodiments;

DESCRIPTION OF EMBODIMENTS

Figure 1:
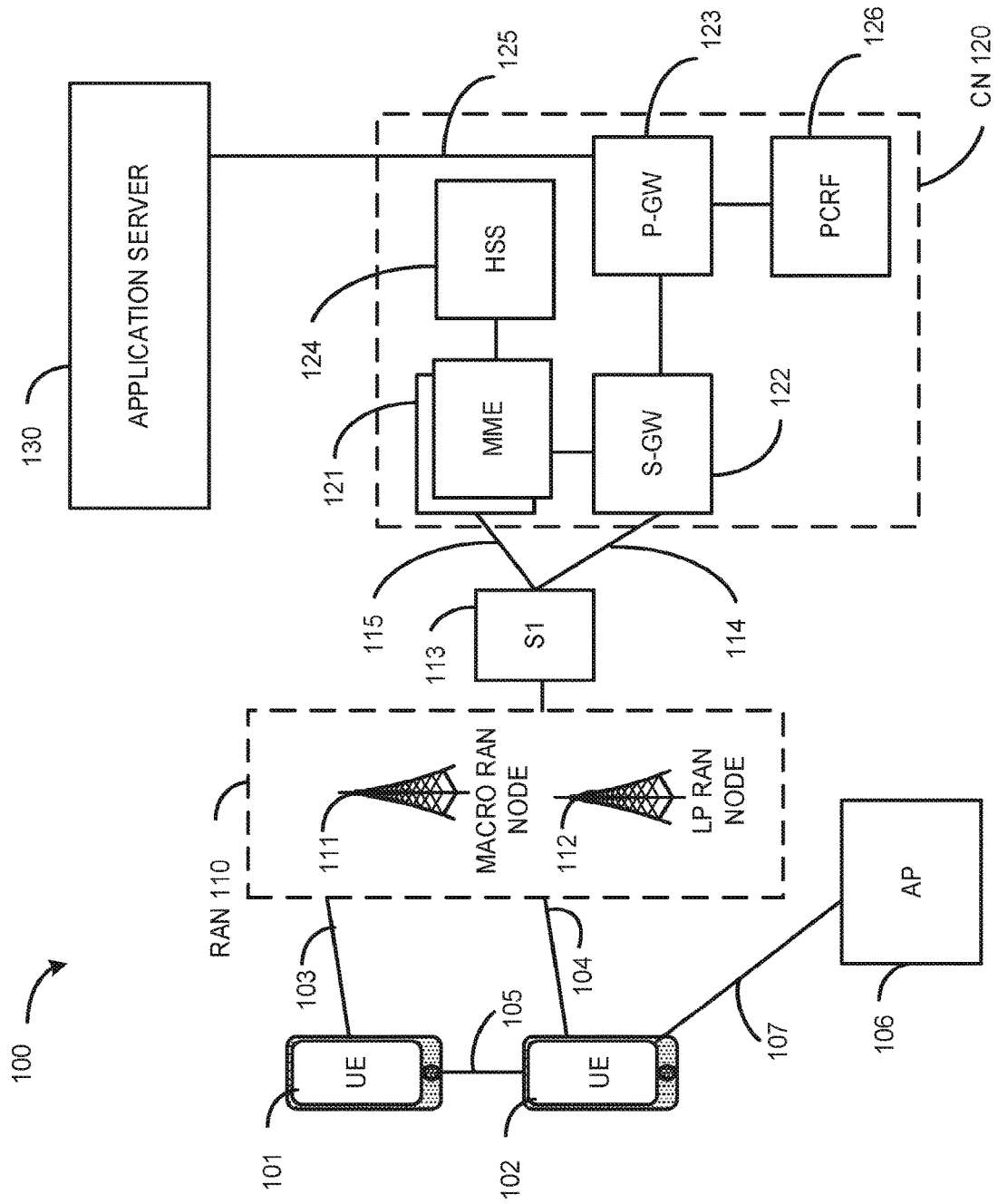
FIG. 1 illustrates an exemplary system architecture of a wireless network in accordance with some embodiments.

FIG. 1 illustrates an architecture of a system 100 of a network in accordance with some embodiments. In some embodiments, the system 100 may be configured for efeMTC operations, for example, transmission and reception of efeMTC synchronization signals for enhanced cell search and enhanced system information acquisition.

The system 100 is shown to include a user equipment (UE) 101 and a UE 102, for example a UE configured for efeMTC operations. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT LIE can utilize technologies such as machine-to-machine (M2M) or machine-type communications (MTC) for exchanging data with an MTC server or device via a public land mobile network (PLMN), Proximity-Based Service (Prose) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSCCH), a Physical Sidelink Discovery Channel (PSCCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104, for example, for a efeMTC operation. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MIMES 121.

In this embodiment, the CN 120 comprises the MMEs 121, the S-GW 122, the Packet Data Network (PDN) Gateway (P-GW) 123, and a home subscriber server (HSS) 124. The MMES 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LIE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2A:
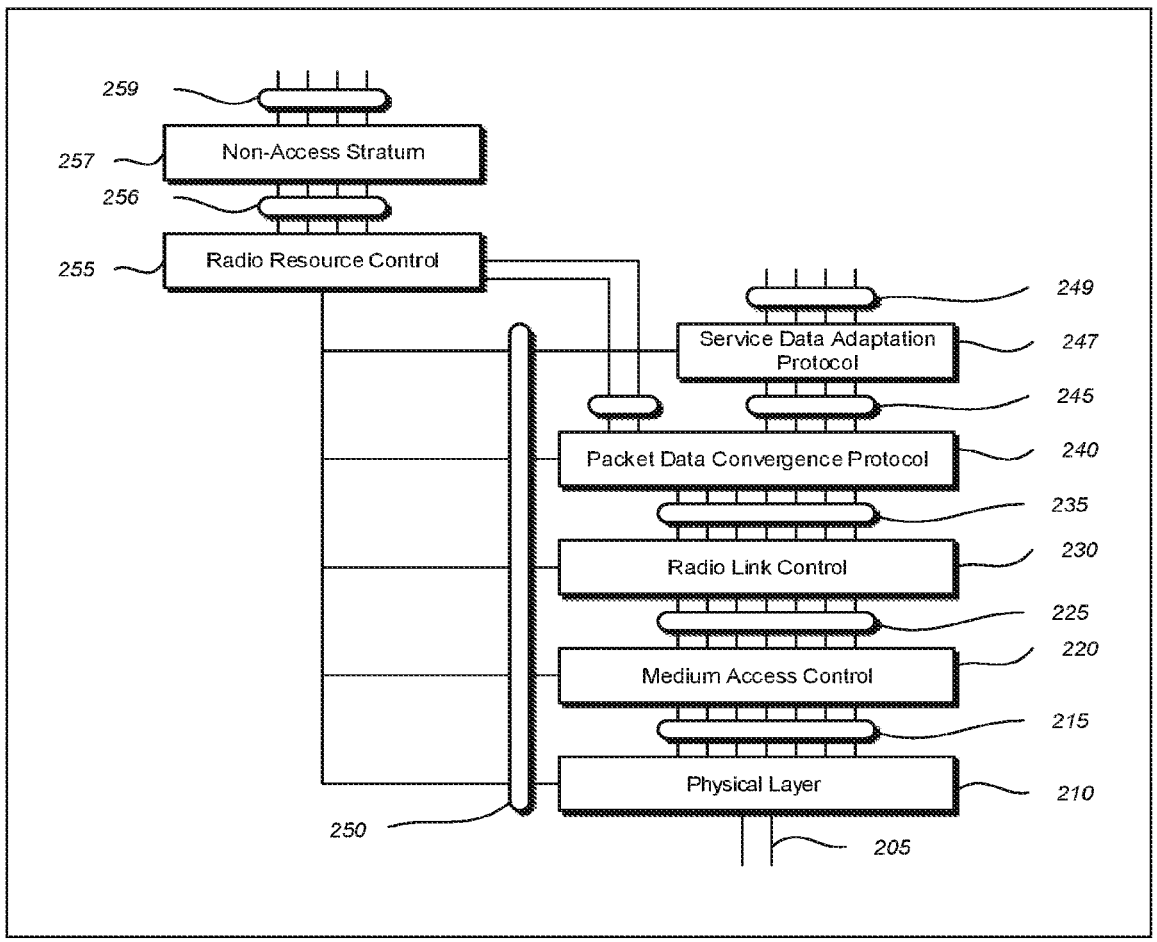
FIG. 2A illustrates protocol functions that may be implemented in a wireless communication device in accordance with some embodiments.

FIG. 2A illustrates protocol functions that may be implemented in a wireless communication device in accordance with some embodiments, for example in a UE or BS configured for efeMTC operations.

In some embodiments, protocol layers may include one or more of physical layer (PHY) 210, medium access control layer (MAC) 220, radio link control layer (RLC) 230, packet data convergence protocol layer (PDCP) 240, service data adaptation protocol (SDAP) layer 247, radio resource control layer (RRC) 255, and non-access stratum (NAS) layer 257, in addition to other higher layer functions not illustrated.

According to some embodiments, protocol layers may include one or more service access points that may provide communication between two or more protocol layers.

According to some embodiments, PHY 210 may transmit and receive physical layer signals 205 that may be received or transmitted respectively by one or more other communication devices (e.g., UE 101, UE 102, device 300). According to some aspects, physical layer signals 205 may comprise one or more physical channels.

According to some embodiments, an instance of PHY 210 may process requests from and provide indications to an instance of MAC 220 via one or more physical layer service access points (PHY-SAP) 215. According to some embodiments, requests and indications communicated via PHY-SAP 215 may comprise one or more transport channels.

According to some embodiments, an instance of MAC 210 may process requests from and provide indications to an instance of RLC 230 via one or more medium access control service access points (MAC-SAP) 225. According to some embodiments, requests and indications communicated via MAC-SAP 225 may comprise one or more logical channels.

According to some embodiments, an instance of RLC 230 may process requests from and provide indications to an instance of PDCP 240 via one or more radio link control service access points (RLC-SAP) 235. According to some embodiments, requests and indications communicated via RLC-SAP 235 may comprise one or more RLC channels.

According to some embodiments, an instance of PDCP 240 may process requests from and provide indications to one or more of an instance of RRC 255 and one or more instances of SDAP 247 via one or more packet data convergence protocol service access points (PDCP-SAP) 245. According to some embodiments, requests and indications communicated via PDCP-SAP 245 may comprise one or more radio bearers.

According to some embodiments, an instance of SDAP 247 may process requests from and provide indications to one or more higher layer protocol entities via one or more service data adaptation protocol service access points (SDAP-SAP) 249. According to some embodiments, requests and indications communicated via SDAP-SAP 249 may comprise one or more quality of service (QoS) flows.

According to some embodiments, RRC entity 255 may configure, via one or more management service access points (M-SAP), embodiments of one or more protocol layers, which may include one or more instances of PHY 210, MAC 220, RLC 230, PDCP 240 and SDAP 247. According to some embodiments, an instance of RRC may process requests from and provide indications to one or more NAS entities via one or more RRC service access points (RRC-SAP).

Figure 2B:
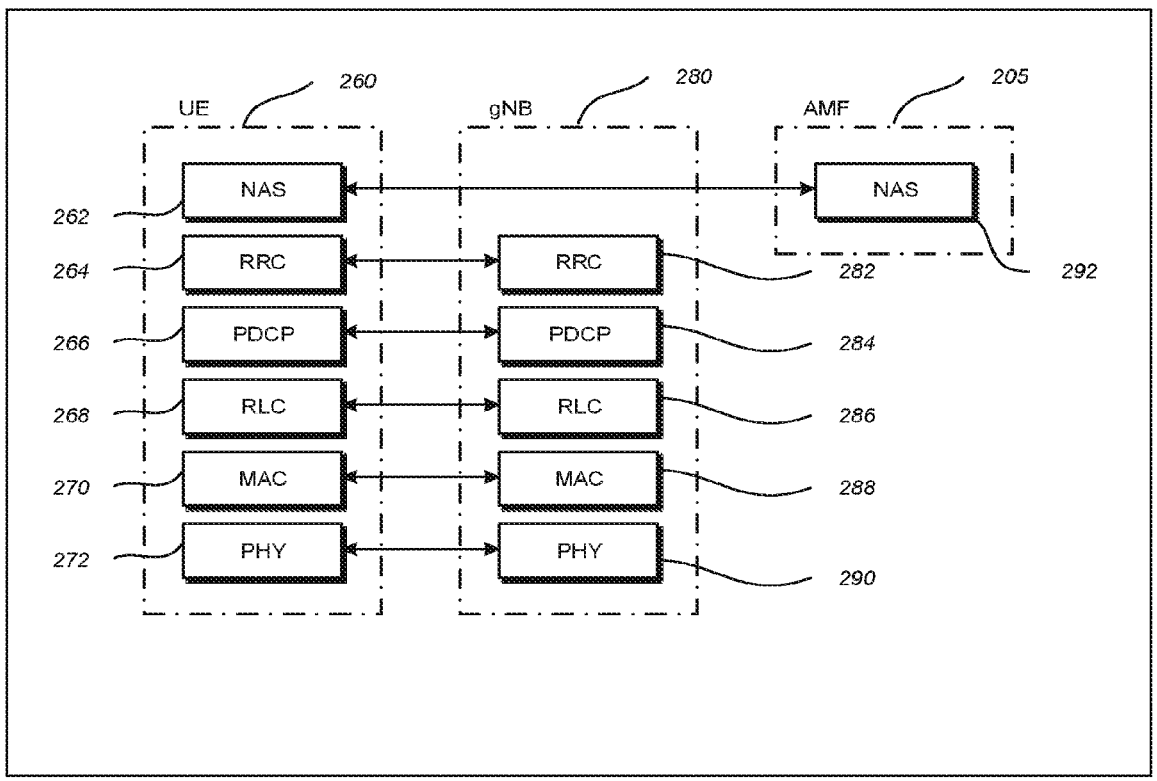
FIG. 2B illustrates protocol entities that may be implemented in wireless communication devices in accordance with some embodiments.

FIG. 2B illustrates protocol entities that may be implemented in wireless communication devices in accordance with some embodiments. For example, protocol entities that may be implemented in wireless communication devices, configured for efeMTC operations, including one or more of a LE 260 (e.g., UE 101, UE 102, device 300), a base station, which may be termed an evolved node B (eNB), or new radio node B (gNB) 280, and a network function, which may be termed a mobility management entity (MIME), or an access and mobility management function (AMF) 294, according to some embodiments.

According to some embodiments, 5GNB 280 may be implemented as one or more of a dedicated physical device such as a macro-cell, a femto-cell or other suitable device, or in an alternative aspect, may be implemented as one or more software entities running on server computers as part of a virtual network termed a cloud radio access network (CRAN).

According to some embodiments, one or more protocol entities that may be implemented in one or more of UE 260 (e.g., UE 101, LE 102, device 300), gNB 280 and AMF 294, may be described as implementing all or part of a protocol stack in which the layers are considered to be ordered from lowest to highest in the order PHY, MAC, RLC, PDCP, RRC and NAS. According to some embodiments, one or more protocol entities that may be implemented in one or more of UE 260, gNB 280 and AMF 294, may communicate with a respective peer protocol entity that may be implemented on another device, using the services of respective lower layer protocol entities to perform such communication.

According to some embodiments, UE PHY 272 and peer entity gNB PHY 290 may communicate using signals transmitted and received via a wireless medium. According to some embodiments, UE MAC 270 and peer entity gNB MAC 288 may communicate using the services provided respectively by UE PHY 272 and gNB PHY 290. According to some embodiments, UE RLC 268 and peer entity gNB RLC 286 may communicate using the services provided respectively by LIE MAC 270 and gNB MAC 288. According to some embodiments, UE PDCP 266 and peer entity gNB PDCP 284 may communicate using the services provided respectively by UE RLC 268 and 5GNB RLC 286. According to some embodiments, HE RRC 264 and gNB RRC 282 may communicate using the services provided respectively by UE PDCP 266 and gNB PDCP 284. According to some embodiments, UE NAS 262 and AMF NAS 292 may communicate using the services provided respectively by HE RRC 264 and gNB RRC 282.

Figure 3:
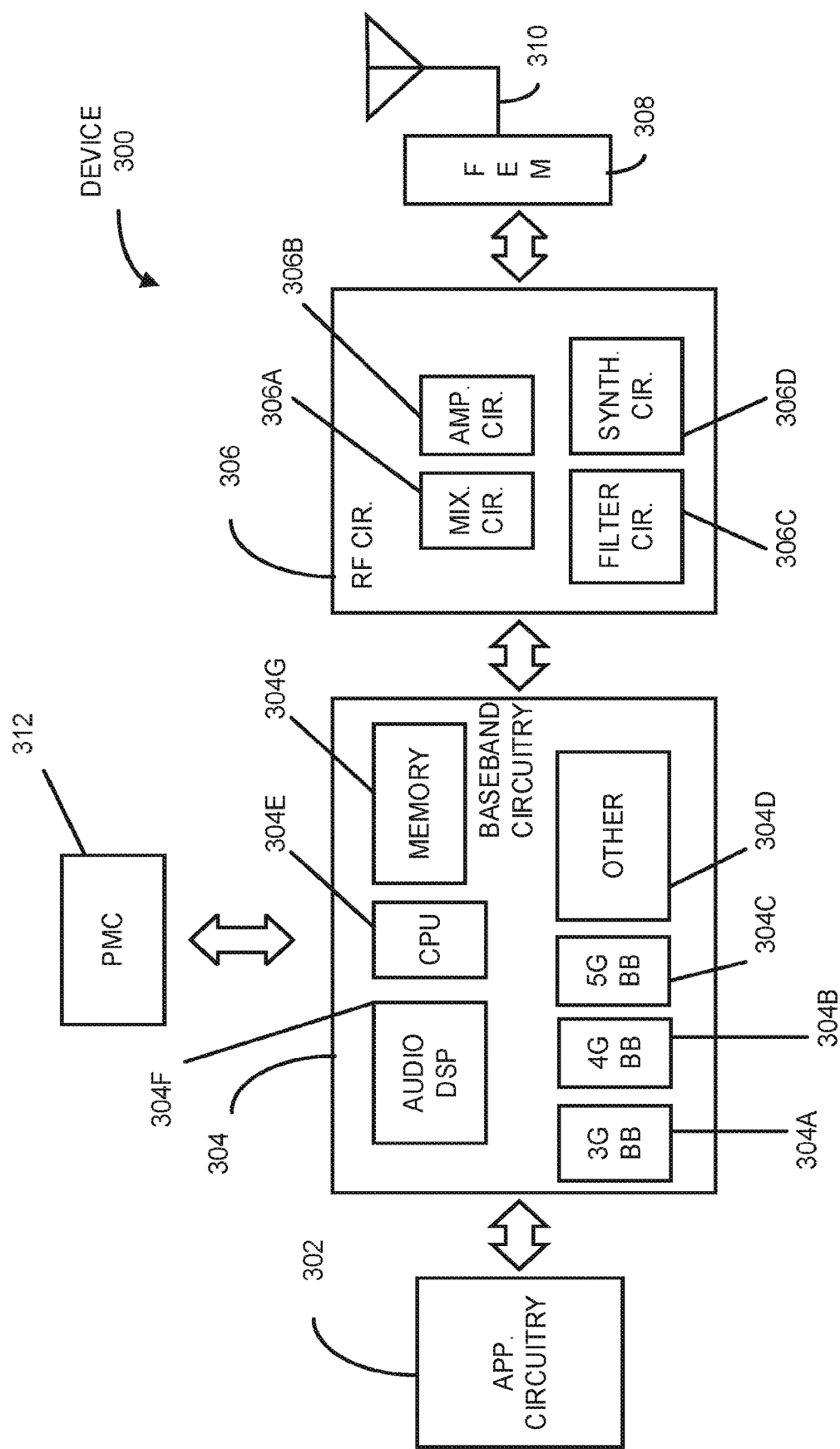
FIG. 3 illustrates example components of a device in accordance with some embodiments.

FIG. 3 illustrates example components of a device 300 in accordance with some embodiments. For example, the device 300 may be a device configured for efeMTC operations (e.g., UE 101, UE 102, UE 260, RAN Node 111/112).

In some embodiments, the device 300 may include application circuitry 302, baseband circuitry 304, Radio Frequency (RF) circuitry 306, front-end module (FEM) circuitry 308, one or more antennas 310, and power management circuitry (PMC) 312 coupled together at least as shown. The components of the illustrated device 300 may be included in a UE (e.g., UE 101, UE 102, HE 260) or a RAN node (e.g., Macro RAN node 111, LP RAN node 112, gNB 280). In some embodiments, the device 300 may include less elements (e.g., a RAN node may not utilize application circuitry 302, and instead may include a processor/controller to process IP data received from an EPC). In some embodiments, the device 300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 302 may include one or more application processors. For example, the application circuitry 302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 300. In some embodiments, processors of application circuitry 302 may process IP data packets received from an EPC.

The baseband circuitry 304 may include circuitry such as, but not limited to, one or more single-core or multi-core processors. The baseband circuitry 304 may include one or more baseband processors or control logic to process baseband signals received from a receive signal path of the RF circuitry 306 and to generate baseband signals for a transmit signal path of the RF circuitry 306. Baseband processing circuitry 304 may interface with the application circuitry 302 for generation and processing of the baseband signals and for controlling operations of the RF circuitry 306. For example, in some embodiments, the baseband circuitry 304 may include a third generation (3G) baseband processor 304A, a fourth generation (4G) baseband processor 304B, a fifth generation (5G) baseband processor 304C, or other baseband processor(s) 304D for other existing generations, generations in development or to be developed in the future (e.g., second generation (2G), sixth generation (6G), etc.). The baseband circuitry 304 (e.g., one or more of baseband processors 304A-D) may handle various radio control functions that enable communication with one or more radio networks via the RF circuitry 306.

In other embodiments, some or all of the functionality of baseband processors 304A-D may be included in modules stored in the memory 304G and executed via a Central Processing Unit (CPU) 304E. The radio control functions may include, but are not limited to, signal modulation/demodulation, encoding/decoding, radio frequency shifting, etc. In some embodiments, modulation/demodulation circuitry of the baseband circuitry 304 may include Fast-Fourier Transform (FFT), precoding, or constellation mapping/demapping functionality. In some embodiments, encoding/decoding circuitry of the baseband circuitry 304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 304 may include one or more audio digital signal processor(s) (DSP) 304F. The audio DSP(s) 304F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 304 and the application circuitry 302 may be implemented together such as, for example, on a system on a chip (SOC).

In some embodiments, the baseband circuitry 304 may provide for communication compatible with one or more radio technologies. For example, in some embodiments, the baseband circuitry 304 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 304 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RE circuitry 306 may include switches, filters, amplifiers, etc. to facilitate the communication with the wireless network. RF circuitry 306 may include a receive signal path which may include circuitry to down-convert RF signals received from the FEM circuitry 308 and provide baseband signals to the baseband circuitry 304. RF circuitry 306 may also include a transmit signal path which may include circuitry to up-convert baseband signals provided by the baseband circuitry 304 and provide RF output signals to the FE vi circuitry 308 for transmission.

In some embodiments, the receive signal path of the RF circuitry 306 may include mixer circuitry 306A, amplifier circuitry 306B and filter circuitry 306C. In some embodiments, the transmit signal path of the RF circuitry 306 may include filter circuitry 306C and mixer circuitry 306A. RE circuitry 306 may also include synthesizer circuitry 306D for synthesizing a frequency for use by the mixer circuitry 306A of the receive signal path and the transmit signal path. In some embodiments, the mixer circuitry 306A of the receive signal path may be configured to down-convert RF signals received from the FEM circuitry 308 based on the synthesized frequency provided by synthesizer circuitry 306D. The amplifier circuitry 306B may be configured to amplify the down-converted signals and the filter circuitry 306C may be a low-pass filter (LPF) or band-pass filter (BPF) configured to remove unwanted signals from the down-converted signals to generate output baseband signals. Output baseband signals may be provided to the baseband circuitry 304 for further processing. In some embodiments, the output baseband signals may be zero-frequency baseband signals, although this is not a requirement. In some embodiments, mixer circuitry 306A of the receive signal path may comprise passive mixers, although the scope of the embodiments is not limited in this respect.

In some embodiments, the mixer circuitry 306A of the transmit signal path may be configured to up-convert input baseband signals based on the synthesized frequency provided by the synthesizer circuitry 306D to generate RF output signals for the FEM circuitry 308. The baseband signals may be provided by the baseband circuitry 304 and may be filtered by filter circuitry 306C.

In some embodiments, the mixer circuitry 306A of the receive signal path and the mixer circuitry 306A of the transmit signal path may include two or more mixers and may be arranged for quadrature downconversion and upconversion, respectively. In some embodiments, the mixer circuitry 306A of the receive signal path and the mixer circuitry 306A of the transmit signal path may include two or more mixers and may be arranged for image rejection (e.g., Hartley image rejection). In some embodiments, the mixer circuitry 306A of the receive signal path and the mixer circuitry 306A may be arranged for direct downconversion and direct upconversion, respectively. In some embodiments, the mixer circuitry 306A of the receive signal path and the mixer circuitry 306A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 304 may include a digital baseband interface to communicate with the RF circuitry 306.

In some dual-mode embodiments, a separate radio IC circuitry may be provided for processing signals for each spectrum, although the scope of the embodiments is not limited in this respect.

In some embodiments, the synthesizer circuitry 306D may be a fractional-N synthesizer or a fractional N/N+1 synthesizer, although the scope of the embodiments is not limited in this respect as other types of frequency synthesizers may be suitable. For example, synthesizer circuitry 306D may be a delta-sigma synthesizer, a frequency multiplier, or a synthesizer comprising a phase-locked loop with a frequency divider.

The synthesizer circuitry 306D may be configured to synthesize an output frequency for use by the mixer circuitry 306A of the RF circuitry 306 based on a frequency input and a divider control input. In some embodiments, the synthesizer circuitry 306D may be a fractional N/N+1 synthesizer.

In some embodiments, frequency input may be provided by a voltage controlled oscillator (VCO), although that is not a requirement. Divider control input may be provided by either the baseband circuitry 304 or the applications processor 302 depending on the desired output frequency. In some embodiments, a divider control input (e.g., N) may be determined from a look-up table based on a channel indicated by the applications processor 302.

Synthesizer circuitry 306D of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the MID may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 306 may include an IQ/polar converter.

FEM circuitry 308 may include a receive signal path which may include circuitry configured to operate on RF signals received from one or more antennas 310, amplify the received signals and provide the amplified versions of the received signals to the RF circuitry 306 for further processing. FEM circuitry 308 may also include a transmit signal path which may include circuitry configured to amplify signals for transmission provided by the RF circuitry 306 for transmission by one or more of the one or more antennas 310. In various embodiments, the amplification through the transmit or receive signal paths may be done solely in the RF circuitry 306, solely in the FEM 308, or in both the RF circuitry 306 and the FEM 308.

In some embodiments, the FEM circuitry 308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 306), and one or more filters to generate RF signals for subsequent transmission (e.g., by one or more of the one or more antennas 310).

In some embodiments, the PMC 312 may manage power provided to the baseband circuitry 304. In particular, the PMC 312 may control power-source selection, voltage scaling, battery charging, or DC-to-DC conversion. The PMC 312 may often be included when the device 300 is capable of being powered by a battery, for example, when the device is included in UE. The PMC 312 may increase the power conversion efficiency while providing desirable implementation size and heat dissipation characteristics.

While FIG. 3 shows the PMC 312 coupled only with the baseband circuitry 304. However, in other embodiments, the PMC 312 may be additionally or alternatively coupled with, and perform similar power management operations for, other components such as, but not limited to, application circuitry 302, RF circuitry 306, or FEM 308.

In some embodiments, the PMC 312 may control, or otherwise be part of, various power saving mechanisms of the device 300. For example, if the device 300 is in an RRC_Connected state, where it is still connected to the RAN node as it expects to receive traffic shortly, then it may enter a state known as Discontinuous Reception Mode (DRX) after a period of inactivity. During this state, the device 300 may power down for brief intervals of time and thus save power.

If there is no data traffic activity for an extended period of time, then the device 300 may transition off to an RRC Idle state, where it disconnects from the network and does not perform operations such as channel quality feedback, handover, etc. The device 300 goes into a very low power state and it performs paging where again it periodically wakes up to listen to the network and then powers down again. The device 300 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 302 and processors of the baseband circuitry 304 may be used to execute elements of one or more instances of a protocol stack (e.g., protocol stack described with respect to FIGS. 2A and 2B). For example, processors of the baseband circuitry 304, alone or in combination, may be used execute Layer 3, Layer 2, or Layer 1 functionality, while processors of the application circuitry 304 may utilize data (e.g., packet data) received from these layers and further execute Layer 4 functionality (e.g., transmission communication protocol (TCP) and user datagram protocol (UDP) layers). As referred to herein, Layer 3 may comprise a RRC layer (e.g., 255, 264, 282), As referred to herein, Layer 2 may comprise a MAC layer (e.g., 220, 270, 288), a RLC layer (e.g., 230, 268, 286), and a PDCP layer (e.g., 240, 266, 284), As referred to herein, Layer 1 may comprise a PRY layer (e.g., 210, 272, 290) of a UE/RAN node.

Figure 4:
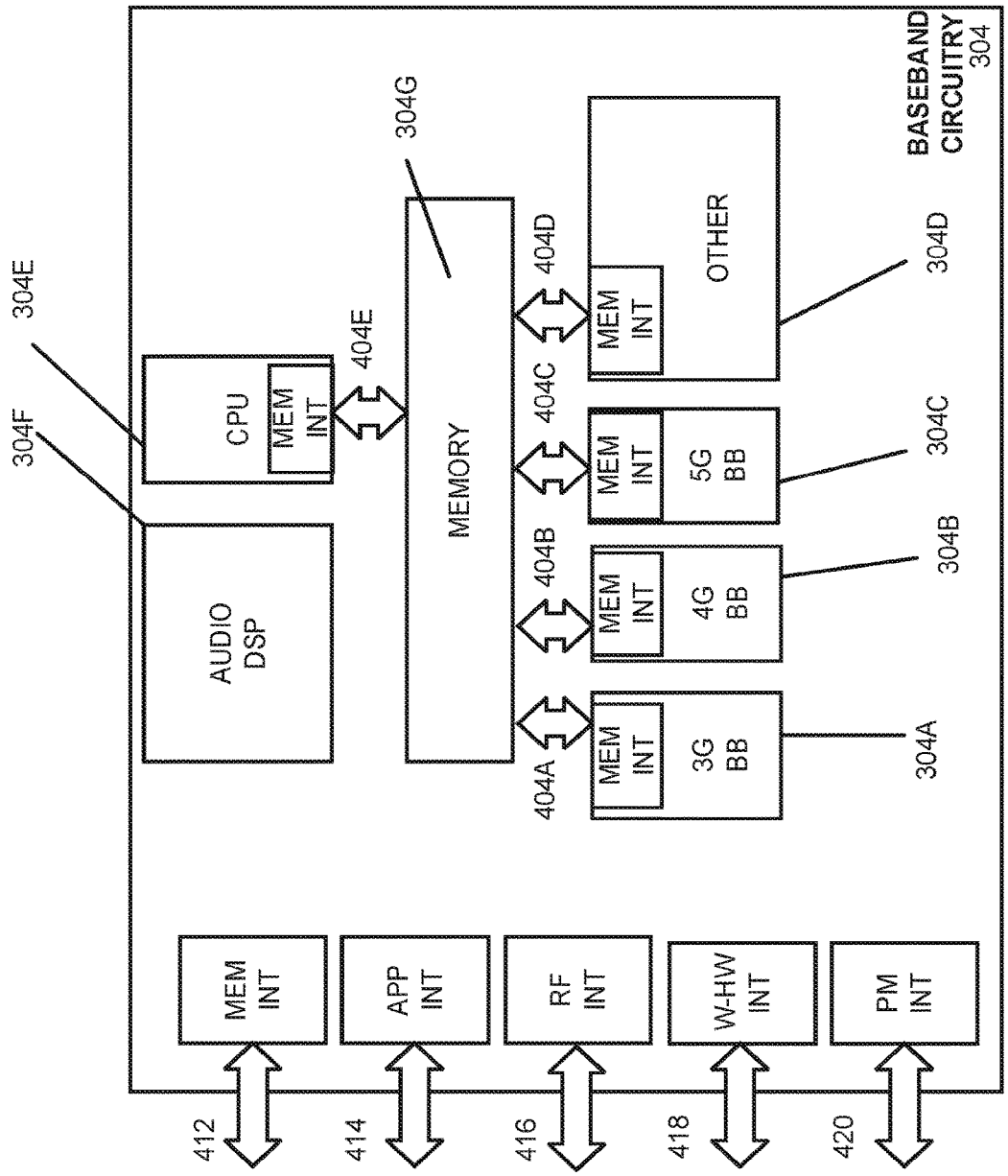
FIG. 4 illustrates example interfaces of baseband circuitry in accordance with some embodiments.

FIG. 4 illustrates example interfaces of baseband circuitry in accordance with some embodiments. As discussed above, the baseband circuitry 304 of FIG. 3 may comprise processors 304A-304E and a memory 304G utilized by said processors. Each of the processors 304A-304E may include a memory interface, 404A-404E, respectively, to send/receive data to/from the memory 304G.

The baseband circuitry 304 may further include one or more interfaces to communicatively couple to other circuitries/devices, such as a memory interface 412 (e.g., an interface to send/receive data to/from memory external to the baseband circuitry 304), an application circuitry interface 414 (e.g., an interface to send/receive data to/from the application circuitry 302 of FIG. 3), an RF circuitry interface 416 (e.g., an interface to send/receive data to/from RF circuitry 306 of FIG. 3), a wireless hardware connectivity interface 418 (e.g., an interface to send/receive data to/from Near Field Communication (NEC) components, Bluetooth® components (e.g., Bluetooth® Low Energy), Wi-Fi® components, and other communication components), and a power management interface 420 (e.g., an interface to send/receive power or control signals to/from the PMC 312).

Figure 5:
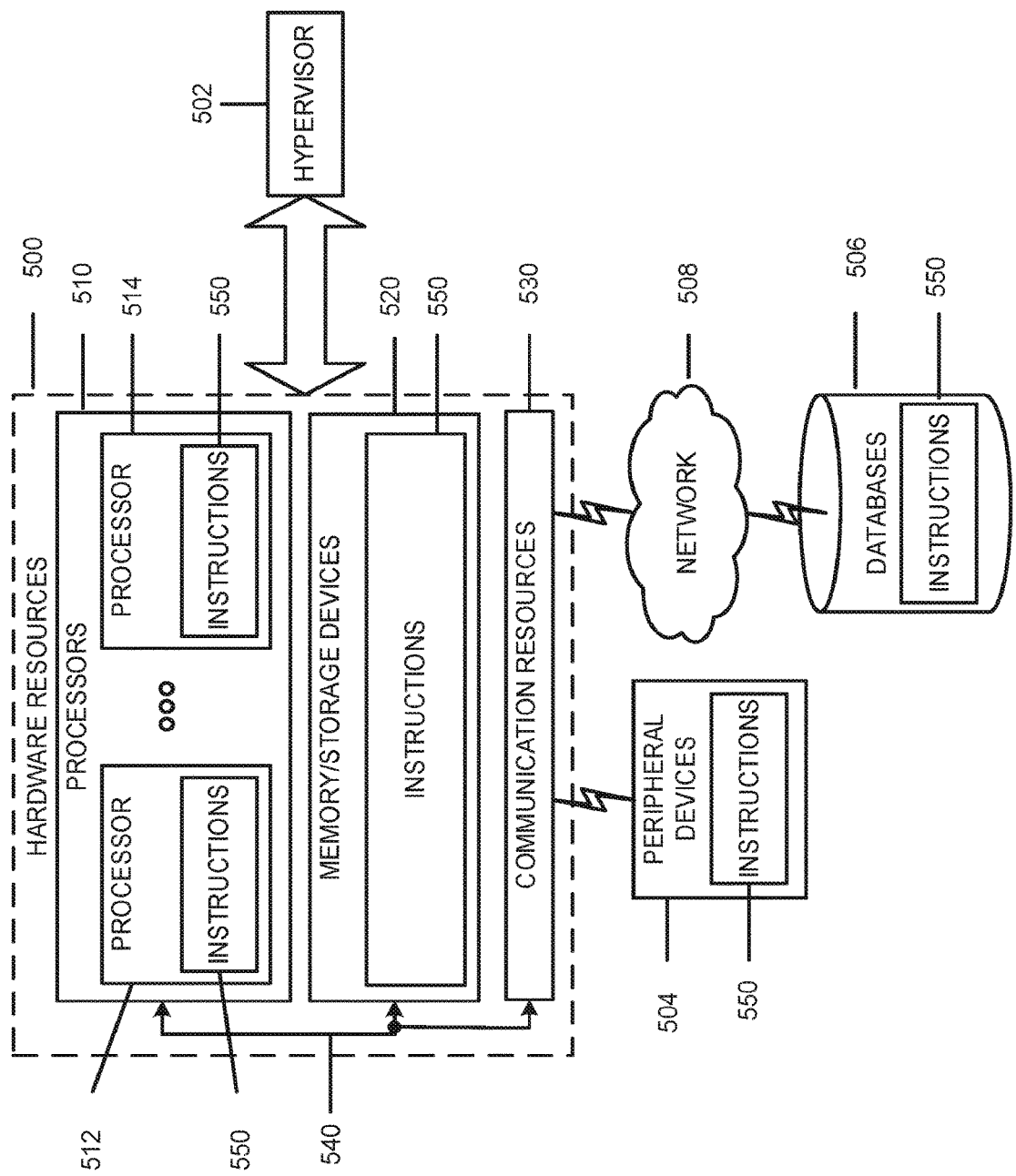
FIG. 5 is a block diagram illustrating components, according to some example embodiments, able to read instructions from a machine-readable or computer-readable medium.

FIG. 5 is a block diagram illustrating components, according to some example embodiments, able to read instructions from a machine-readable or computer-readable medium (e.g., a non-transitory machine-readable storage medium) and perform any one or more of the methodologies discussed herein, for example, one or more efeMTC operations. Specifically, FIG. 5 shows a diagrammatic representation of hardware resources 500 including one or more processors (or processor cores) 510, one or more memory/storage devices 520, and one or more communication resources 530, each of which may be communicatively coupled via a bus 540. For embodiments where node virtualization (e.g., NFV) is utilized, a hypervisor 502 may be executed to provide an execution environment for one or more network slices/sub-slices to utilize the hardware resources 500.

The processors 510 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 512 and a processor 514.

The memory/storage devices 520 may include main memory, disk storage, or any suitable combination thereof. The memory/storage devices 520 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 530 may include interconnection or network interface components or other suitable devices to communicate with one or more peripheral devices 504 or one or more databases 506 via a network 508. For example, the communication resources 530 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 550 may comprise software, a program, an application, an applet, an app, or other executable code for causing at least any of the processors 510 to perform any one or more of the methodologies discussed herein. The instructions 550 may reside, completely or partially, within at least one of the processors 510 (e.g., within the processor's cache memory), the memory/storage devices 520, or any suitable combination thereof. Furthermore, any portion of the instructions 550 may be transferred to the hardware resources 500 from any combination of the peripheral devices 504 or the databases 506. Accordingly, the memory of processors 510, the memory/storage devices 520, the peripheral devices 504, and the databases 506 are examples of computer-readable and machine-readable media.

In some embodiments, enhancements to cell search operations (e.g., for efeMTC) may include introducing new sequences for efeMTC synchronization signals. In some embodiments, new synchronization signals (e.g., efeMTC synchronization signals) may be primary synchronization signals (PSS) (e.g., efeMTC PSS) and/or secondary synchronization signals (SSS) (e.g., efeMTC SSS). These new sequences may be obtained from a Zadoff-Chu sequence and such sequences may be pre-defined. In some embodiments, such sequences may be constant amplitude zero autocorrelation (CAZAC) sequences, maximum length sequences (m-sequence), an/or Gold sequences. In some embodiments, such sequences may be obtained from legacy (e.g., LTE legacy PSS and/or SSS) sequences, and may be based on a root index different from a root index of the legacy sequence (e.g., a different Zadoff-Chu root sequence index). In another embodiment, Narrowband Primary Synchronization Signals (NPSS) and/or Narrowband. Primary Synchronization Signals (NSSS) sequences may be used for generating efeMTC synchronization signals. In one example, a NPSS sequence and/or a NSSS sequence may be generated using a same Physical Cell Identifier (PCID) (e.g., physical-layer cell identity $N_{ID}^{(2)}$) as is used for the generation of a PSS sequence and/or a SSS sequence, and a new synchronization signal (e.g., efeMTC synchronization signal) may be generated using a same PCID (e.g., physical-layer cell identity $N_{ID}^{(2)}$) as is used for the generation of a PSS sequence and/or a SSS sequence, or a NPSS sequence and/or a NSSS. In some embodiments, processing circuitry of a device (e.g. RAN nodes 111 and 112, BS, eNB, gNB) may be configured to encode signaling in a subframe for transmission that includes such new sequences for synchronization signals.

In some embodiments, enhancements to cell search operations may include introducing special measurement subframes to a radio frame format, for example, special measurement subframes that may include multiple copies of the LTE PSS and/or SSS. In other embodiments, the special measurement subframes may include the NPSS and/or NSSS, and/or other sequences, such as the new synchronization signals (e.g., efeMTC synchronization signals). In some embodiments, the special measurement subframes may include a combination of any of such sequences in a single subframe. The positioning of any of the described sequences may follow a specific pattern. For example, in certain embodiments, for the Orthogonal Frequency Division Multiplexing (OFDM) symbols that normally carry cell specific reference signals (CRS), resources elements (REs) may remain unchanged from a LTE legacy configuration to maintain backward compatibility. Depending on mobility and delay sensitivity of a LIE (e.g., CE UE), the periodicity of such special subframes can change and can be configured.

In some embodiments, enhancements to time domain operations (e.g., for efeMTC) may include introducing additional symbols within a subframe, for example, additional symbols for a efeMTC synchronization signal (e.g., including efeMTC PSS/SSS, NPSS/NSSS symbols). For frequency division duplex (FDD), legacy PSS may be transmitted on symbol #6 with normal cyclic prefix (CP). Therefore, in some embodiments, an additional PSS symbol (e.g., efeMTC PSS) may be transmitted on symbols other than symbol #5 and symbol #6 in a subframe (e.g., symbol #3). For FDD, legacy SSS may be transmitted on symbol #5 with normal CP, thus in some embodiments, an additional SSS symbol (e.g., efeMTC SSS) may be transmitted on symbols other than #5 and #6 (e.g., symbol #2).

For time division duplex (TDD), legacy PSS may be transmitted on symbol #9 with normal CP. Therefore, in some embodiments, an additional PSS symbol (e.g., efeMTC PSS) may be transmitted on symbols other than symbol #6 and symbol #9 in a subframe (e.g., symbol #5, symbol #10). For TDD, legacy SSS may be transmitted on symbol #6 with normal CP, thus in some embodiments, an additional SSS symbol (e.g., efeMTC SSS) may be transmitted on symbols other than #6 and #9 (e.g., symbol #5, symbol #10, or whichever symbol is not used for the additional PSS/efeMTC PSS).

In another embodiment, a LTE legacy PSS and/or SSS may be used in the legacy positioning for both FDD and TDD, for backward compatibility, while the new PSS/SSS (e.g., efeMTC PSS/SSS) may include sequences that are different from legacy sequences, to avoid confusion, for example. In some embodiments, efeMTC PSS/SSS detection may be boosted by using consecutive symbols, for example, gaining from coherent combining. In certain embodiments, the new PSS/SSS (e.g., efeMTV PSS/SSS) may be carried in subframes other than subframes #0 and #5, for FDD, and subframes #0 and #5 and/or #1 and #6, for TDD.

In some embodiments, additional subframes may carry NPSS and/or NSSS (e.g., NPSS/NSSS). The repetition may occur in the time domain on two or more consecutive subframes, or may be interlaced. For example, subframes that do not contain LTE legacy PSS/SSS nor PBCH (e.g., subframes #0, #5, and #9 in FDD and subframes #0, #1, #5, and #6 TDD) may include the NPSS and/or NSSS. For example, if NPSS and/or NSSS are used, they may be transmitted in one or more of subframes #i-#4 and #6-#8 for FDD, and subframes #2-#4 and #7-#9 for TDD.

Enhancements to frequency domain operations (e.g., for efeMTC), in certain embodiments, may include frequency domain repetition, for example, where NPSS and/or NSSS are introduced. In some embodiments, NPSS and/or NSSS may be transmitted in multiple physical resource blocks (PRBs). PRBs carrying NPSS and/or NSSS may be predefined, for example, the first or last N PRBs within the central 72 subcarriers. In one embodiment, the location of NPSS and/or NSSS may be within the central 72 tones, but the PRB location may depend on an even or odd system bandwidth, for example, in situations when a DC tone is in the central PRB for odd system bandwidth. In some embodiments, for handling the DC tone in odd system bandwidth, the central PRB may not be configured for NPSS/NSSS transmission. In other embodiments, for handling the DC tone in odd system bandwidth, the central PRB may still be used for NPSS/NSSS, but the length-12 frequency domain NPSS/NSSS may be mapped to 12 tones other than DC tone in central PRB, and the DC tone may be skipped.

To reduce the burden of the UE in determining whether to detect for the transmission of new synchronization signals (e.g., efeMTC synchronization signal, synchronization signal different from legacy PSS/SSS, NPSS/NSSS), a base station (e.g., evolved node B (eNodeB, eNB), gNodeB (gNB)) may indicate to the UE whether the UE should detect for new synchronization signals (e.g., including PSS/SSS, NPSS/NSSS, efeMTC synchronization signal different from legacy PSS/SSS/NPSS/NSSS). In certain embodiments, the base station may transmit such signaling in system information block (SIB) signaling (e.g., narrowband SIB, bandwidth reduced SIB). For example, a base station may indicate to a LE, within SIB signaling, resource information associated with a new synchronization signal (e.g., including PSS/SSS, NPSS/NSSS, efeMTC synchronization signal) such as a periodicity of the efeMTC synchronization signal, an indication of a duration of the efeMTC synchronization signal (e.g., number of symbols per subframe, number of subframes), or an indication of PRBs for transmission of the efeMTC synchronization signal.

Once detecting synchronization signals (e.g., PSS/SSS, NPSS/NSSS, efeMTC synchronization signal different from legacy PSS/SSS/NPSS/NSSS), in some embodiments, a UE may assume a configuration of the detected synchronization signals to be a long-term property of a cell, for example, for subsequent cell reacquisition. In certain embodiments, a UE may assume a configuration of new synchronization signals (e.g., efeMTC synchronization signal) with respect to a cell to be the same as a previous time the UE accessed the cell. In such embodiments, the UE may consider the configuration of new synchronization signals to be long-term behavior. For cell reacquisition, such embodiments may allow a UE to directly perform synchronization without blindly detecting. In certain embodiments, a base station may transmit the new synchronization signals using a Physical Broadcast Channel (PBCH).

In some embodiments, enhancements to system information acquisition (e.g., for efeMTC) may include the enhancement of Master Information Blocks (MIB) (e.g., MIB-NB), System Information Blocks (SIB) (e.g., narrowband SIBs, type-1 narrowband SIB (SIB1-NB), type-1 bandwidth reduced SIB (SIB1-BR)), and other SI messages. In some embodiments, the PBCH repetitions may be increased and may be distributed in time. In one embodiment, legacy PBCH and PBCH repetition in eMTC (e.g., eMTC PBCH) may be included in subframes #0 and #9 (e.g., for FDD) and subframes #0 and #5 (e.g., for TDD), while additional PBCH repetitions may be included in subframes #4 and #5. Legacy PBCH may be used, in some embodiments, to maintain backward compatibility. In some embodiments, subframes N (e.g., N=4) may be used for the transmission of SIB1-BR or for the repetition of eMTC PBCH, and this may be done alternating between the two among frames, for example, SIB1-BR in even frames, and eMTC PBCH in odd frames, or vice versa.

For eMTC, legacy PBCH may be repeated in subframes #0 and #9 for FDD and subframes #0 and #5 for TDD, and for 3 MHz bandwidth, PBCH may be repeated in SF #0 in all frames for TDD. In some embodiments, a special subframe may be defined with a configurable periodicity and the special subframe may contain multiple repetitions of the PBCH.

In certain embodiments, a MIB may be scheduled in radio frames and bandwidth that are different from radio frames and bandwidth dedicated for legacy MIB. Higher layers may predefine or specify a schedule and/or pattern of a MIB, for example, in higher layer parameters. In some embodiments, the NPBCH may be used for transmitting MTB. In some cases, both NPBCH and PBCH with repetitions may be transmitted. In some cases, the eMTC PBCH repetitions may not be transmitted if and/or when NPBCH is transmitted, however, the core PBCH may always be transmitted. In some embodiments, the presence of NPBCH may be indicated by the transmission of NPSS and/or NSSS, for example, based on the UE detecting the presence of NPSS/NSSS, the UE may determine that the NPBCH is also transmitted. In one embodiment, the NPBCH may be transmitted in a PRB or multiple PRBs that falls within the central 72 subcarriers but different PRB(s) from NPSS/NSSS. For example, the PRB(s) for NPBCH may maintain a fixed relative location compared to the PRB(s) carrying NPSS/NSSS, and/or may be within one of the central 72 subcarriers, and may be predefined. In some instances, NPBCH may carry 50 bits (e.g., MIB+CRC for NB-IoT), and in other instances the NPBCH may carry 40 bits (e.g., MIB+CRC for eMTC). In some embodiments, different rate matching may be applied for mapping 40 bits to NPBCH.

Sequences for New Synchronization Signals

In some embodiments, new synchronization signals (e.g., efeMTC synchronization signals) may be generated using Zadoff-Chu (ZC) sequences. In some embodiments, efeMTC synchronization signals may include constant amplitude zero autocorrelation (CAZAC) sequences, maximum length sequences (m-sequence), or Gold sequences. In some embodiments, efeMTC synchronization signals may include generating new sequences.

In some embodiments, the efeMTC synchronization signals may be periodic. Different root indices may be used to indicate different cell identifiers (e.g., physical-layer cell identifiers (ACID)) and/or other information, such as updates of MIBs, SIB1 (e.g., SIB1-BR), and/or other SIBs. The efeMTC periodic synchronization signals, in certain embodiments, may be transmitted in a "burst" manner, occupying multiple symbols in each transmission occasion, which may improve the efficiency of synchronization in comparison to transmitting PSS and/or SSS once every 5 milliseconds (ins). The introduction of the efeMTC periodic synchronization signals may improve the tradeoff between the downlink (DL) overhead and power saving gain in comparison to situations where a power saving signal itself provides synchronization functionality (e.g., involving many repetitions), and situations where power saving signal detection depends on legacy PSS/SSS (e.g., power consumption for synchronization based on PSS/SSS resulting in limited power saving gain).

In some embodiments, a single sequence may be used for all cells, while the scrambling code may be different for different cells, or may be different for indication of different information (e.g., MIB, SIB1-BR, other SIBS updates). Different cells may configure the efeMTC synchronization signals (e.g., periodic synchronization signals) at different time instances to randomize the interference.

In some embodiments, a length-63 Zadoff-Chu sequence may be used (e.g., for an efeMTC synchronization signal), where the root indices may be any values from $\{1, 2, \ldots 63\}$, excluding $\{25, 29, 34\}$ (which have been used for LTE PSS). In certain embodiments, sequences having low cross-correlation with legacy PSS/SSS sequences may be used (e.g., cross-correlation values below a specified threshold).

In some embodiments, a length-63 sequence $(d(n))$ may be generated for a new synchronization signal (e.g., efeMTC synchronization signal). For example, the sequence $(d(n))$ may be generated from a Zadoff-Chu sequence according to the following equation:

$$d_u(n) = \begin{cases} e^{-j\frac{\pi u n(n+1)}{63}} & n=0,1,\ldots,30 \\ e^{-j\frac{\pi u (n+1)(n+2)}{63}} & n=31,32,\ldots,61 \end{cases}$$

where the sequence root index u (e.g., Zadoff-Chu sequence index u) may include a value from the set of root indices $\{1, 2, \ldots, 63\}$. In certain embodiments, the set of root indices excludes the root indices 25, 29, and 34. Additionally, in some embodiments, each of the root indices of the set of root indices $\{1, 2, \ldots, 63\}$ may correlate to a separate cell identifier (e.g., PCID).

In some embodiments, a length-62 sequence $(d(0), \ldots, d(61))$ may be generated for a new synchronization signal. For example, the sequence $(d(0), \ldots, d(61))$ may be an interleaved concatenation of two length-31 binary sequences. The concatenated sequence may be scrambled with a scrambling sequence given by another synchronization signal, such as a PSS or a new synchronization signal. In some embodiments, the combination of two length-31 sequences defining a new synchronization signal (e.g., SSS) may differ between subframes according to the following equation:

$$d(2n) = \begin{cases} s_0^{(m_0)}(n)c_0(n) & \text{in subframes } 0, 1, 2, 3, 4 \\ s_1^{(m_1)}(n)c_0(n) & \text{in subframes } 5, 6, 7, 8, 9 \end{cases}$$

$$d(2n+1) = \begin{cases} s_1^{(m_1)}(n)c_1(n)z_1^{m_0}(n) & \text{in subframes } 0, 1, 2, 3, 4 \\ s_0^{(m_0)}(n)c_1(n)z_1^{m_1}(n) & \text{in subframes } 5, 6, 7, 8, 9 \end{cases}$$

where the two length-31 sequences may each correlate to an odd and an even portion of the length-62 sequence $(d(0), \ldots, d(61))$ (e.g., $d(2n)$ is even $d(2n+1)$ is odd and $0 \leq n \leq 30$. The indices $m_0$ and $m_1$ may be derived from the physical-layer cell-identity group $N_{ID}^{(1)}$ according to:

$$m_0 = m' \bmod 31$$

$$m_1 = (m_0 + \lfloor m'/31 \rfloor + 1) \bmod 31$$

$$m' = N_{ID}^{(1)} + q(q+1)/2, \quad q = \left\lfloor \frac{N_{ID}^{(1)} + q'(q'+1)/2}{30} \right\rfloor, \quad q' = \lfloor N_{ID}^{(1)}/30 \rfloor$$

The two sequences $s_0^{(m_0)}$ and $s_1^{(m_1)}$ may be defined as two different cyclic shifts of the M-sequence $\tilde{s}(n)$ according to:

$$s_0^{(m_0)}(n) = \tilde{s}((n+m_0) \bmod 31)$$

$$s_1^{(m_1)}(n) = \tilde{s}((n+m_1) \bmod 31)$$

where $s(\bar{\imath}) = 1 - 2\widetilde{x(\bar{\imath})}$, $0 \leq \bar{\imath} \leq 30$, is defined by:

$$x(\bar{\imath}+5) = (x(\bar{\imath}+2) + x(\bar{\imath})) \bmod 2, \quad 0 \leq \bar{\imath} \leq 25,$$

with initial conditions $x(0)=0$, $x(1)=0$, $x(2)=0$, $x(3)=0$, and $x(4)=1$

The two sequences $c_0(n)$ and $c_1(n)$ may depend on the PSS or a new synchronization signal (e.g., PSS) and may be defined by two different cyclic shifts of the M-sequence $\tilde{c}(n)$ according to:

$$c_0(n) = \tilde{c}((n + N_{ID}^{(2)}) \bmod 31)$$

$$c_1(n) = \tilde{c}((n + N_{ID}^{(2)} + 3) \bmod 31)$$

where $N_{ID}^{(2)} \in \{0, 1, 2\}$ is the physical-layer identity within the physical-layer cell identity group $N_{ID}^{(1)}$ and $\tilde{c}(i) = 1 - 2x(i)$, $0 \leq i \leq 30$, is defined by:

$$x(\bar{\imath}+5) = (x(\bar{\imath}+3) + x(\bar{\imath})) \bmod 2, \quad 0 \leq i \leq 25$$

with initial conditions $x(0)=0$, $x(1)=0$, $x(2)=0$, $x(3)=0$, and $x(4)=1$.

The two sequences $z_0^{(m_0)}(n)$ and $z_1^{(m_1)}(n)$ may be defined by a (e.g., different) cyclic shift of the M-sequence $\tilde{z}(n)$ according to:

$$z_0^{(m_0)}(n) = \tilde{z}((n + (m_0 \bmod 8)) \bmod 31)$$

$$z_1^{(m_1)}(n) = \tilde{z}((n + (m_1 \bmod 8)) \bmod 31)$$

FIG. 6 illustrates a table of physical-layer identities and associated indices, in accordance with some embodiments. In some embodiments, $m_0$ and $m_1$ are obtained from the Table in FIG. 6 and $\tilde{z}(i) = 1 - 2x(i)$, $0 \leq i \leq 30$, is defined by $x(\bar{\imath}+5) = (x(\bar{\imath}+4) + x(\bar{\imath}+2) + x(\bar{\imath}+1) + x(\bar{\imath})) \bmod 2$, $0 \leq i \leq 25$ with initial conditions $x(0)=0$, $x(1)=0$, $x(2)=0$, $x(3)=0$, and $x(4)=1$.

FIG. 7 illustrates exemplary cross-correlations of certain sequences. In some embodiments, FIG. 7 may assume no frequency and time offset and no noise. In some embodiments, the sequences of FIG. 7 may be length-63 Zadoff-Chu sequences.

In some embodiments, root indices of $\{9, 21, 24, 40, 44, 59\}$ may be considered for a new synchronization signal. For example, a set of Zadoff-Chu sequences with root indices from a subset of $\{9, 21, 24, 40, 44, 59\}$ with N elements may be used for different cells, with the $n^{th}$ root index in the subset applied to (PCID mod N)=n−1, wherein PCID may refer to physical cell identifier and N may refer to a number. In other embodiments, different sequences may be used to indicate different information, for example, the three sets $\{9, 40\}$, $\{44, 24\}$ and $\{21, 59\}$ may be used to indicate a partial information of cell identifier (ID) and a change of information (e.g., MIB, SIB1-BR). For example, the first root index of each set may indicate "no change of MIB/SIB1-BR.", the second root index of each set may indicate "change of MIB/SIB1-BR" or vice versa, and the three sets $\{9, 40\}$, $\{44, 24\}$ and $\{21, 59\}$ may correspond to three types of cells (e.g., determined by PCID mod 3). As another example, the root indices close to '1' and/or '63' (e.g., 1, 2, 62, 63) may not be used because they have large timing estimation error under frequency offset. In some embodiments, the frequency offset impact may be considered when selecting the root indices for a new synchronization signal (e.g., periodic synchronization signal).

FIG. 8 and FIG. 9 illustrate exemplary cross-correlations of certain sequences. In some embodiments, FIG. 8 and FIG. 9 assume a frequency offset of 4.5 kilohertz (kHz) and no noise. In some embodiments, the sequences of FIG. 8 and FIG. 9 may be length-63 Zadoff-Chu sequences. In certain embodiments, different receiver algorithms (e.g. parts for partial correlation) may also impact the correlation profile.

In some embodiments, root indices of {9, 21, 24, 25, 29, 34, 40, 44, 59} may be considered for a new synchronization signal (e.g., for efeMTC PSS, efeMTC SSS). For example, a set of Zadoff-Chu sequences with root indices from a subset of {9, 21, 24, 25, 29, 34, 40, 44, 59} with N elements may be used for different cells, with the $n^{th}$ root index in the subset applied to (PCID mod N)=n−1, wherein PCID may refer to physical cell identifier and N may refer to a number. Similar to above, different sequences may be used to indicate different information, such as a partial information of cell ID and a change of information (e.g., MIB, SIB1-NB, SIB1-BR). Also similar to above, a number of sets may correspond to a number of types of cells (e.g., determined by PCID mod 3). Certain root indices may not be used because they have large timing estimation error under frequency offset. In some embodiments, the frequency offset impact may be considered when selecting the root indices for a new synchronization signal (e.g., periodic synchronization signal).

FIG. 10A and FIG. 10B illustrate exemplary cross-correlations of certain sequences. In some embodiments, FIG. 10A and FIG. 10B assume a frequency offset of 4.5 kilohertz (kHz) and no noise. In some embodiments, the sequences of FIG. 10A and FIG. 10B may be length-63 Zadoff-Chu sequences. For example, {23, 30, 40}, {23, 33, 40}, {23, 30, 33} or {30, 33, 40} may be used for a new synchronization signal and wherein the three elements in the set may correspond to three type of cells (e.g., determined by PCID mod 3). In some embodiments, with a repeated new synchronization signal, the frequency offset may be estimated based on the auto correlation between repetitions.

In other embodiments, Zadoff-Chu sequences with shorter length may be used, for example, length-x Zadoff-Chu sequences may be used and repeated over frequency domain to fit into 6 PRBs. In one embodiment, a length-12 sequence may be repeated 6 times over 6 PRBs in the frequency domain. In another embodiment, a length-24 sequence may be used and repeated 3 times in the frequency domain. In yet another embodiment, a length-32 sequence may be used and repeated twice in the frequency domain. Different root indices may be used to indicate the cell ID and/or updates of information (e.g., MIB, SIB1-BR).

In some embodiments, other sequences such as maximum length sequence (M-sequence) or Gold sequence may be used for a new synchronization signal. M-sequence or Gold sequence may have different lengths for different design options. For embodiments where the sequence length is shorter than 6 PRBs, repetitions in frequency domain may be used. The initialization of the M-sequences may depend on a cell ID and/or other information (e.g., MIB, SIB1-BR), such as updates of MIB, SIB1-BR, and/or other SIBs. For example, a length-X M-sequence or Gold sequence may be used, and the $n^{th}$ element of the new synchronization signal can be obtained by 1−2s(n+a), where a=PCID mod Y, s(n) is the M-sequence or Gold sequence, and X and Y being any positive integers (e.g., X may be 63 or 72 and Y may be 3).

In some embodiments, the new synchronization signal may be repeated over multiple symbols and a scrambling code may be applied. The scrambling code may be a binary or complex number. In certain embodiments, the synchronization signal may be repeated over M symbols in a subframe, and a length-M cover code may be applied at symbol level. In some embodiments, M may be predefined (e.g. M=11) and the new synchronization signal may be sent over last 11 symbols over a subframe. In this example, the cover code may be [1, 1, 1, 1, −1, −1, 1, 1, 1, −1, 1] applied to 11 symbols (e.g., as in NB-IoT), or may be any other sequences with a good cross-correlation properties (e.g. length-M Barker codes or Zadoff-Chu sequences).

As another example, the number of symbols occupied by a new synchronization signal within one subframe may be configured, depending on how many symbols are configured for a physical downlink control channel (PDCCH) in LTE and/or how many CRS ports are configured. In some examples, the symbols carrying CRS may not be used for the new synchronization signal. Alternatively, the new synchronization signal may be punctured on the resource elements (RE) with CRS. Depending on the number of symbols occupied by the new synchronization signal, in some embodiments, different scrambling codes (e.g. any sequences such as M-sequence, Barker code, or Zadoff-Chu sequence) with different length may be used. Embodiments described herein may be used for wake-up signal design, for example, if a cross-correlation between a wake-up signal and a new synchronization signal is low.

Synchronization Signal Functionalities

In some embodiments, a new synchronization signal may be used for re-synchronization. For example, antenna ports used for a new synchronization signal (e.g., efeMTC synchronization signal) and the antenna ports used for a legacy synchronization signal (e.g., PSS/SSS) of a serving cell may be quasi co-located (QCL) with respect to Doppler shift and average delay. Quasi co-location may allow for the coherent combining of the efeMTC synchronization signal and the legacy synchronization signal (e.g., PSS/SSS), for example, if they are sent within channel coherence time.

In addition to a synchronization function of the new synchronization signal (e.g., efeMTC synchronization signal), the new synchronization signal may be used for radio resource management (RRM) measurement as well. In one embodiment, the antenna ports used for the new synchronization signal and the antenna ports used for the CRS of a serving cell may be QCL with respect to Doppler shift and average delay. In some embodiments, higher layers may signal the ratio of energy per resource element (EYRE) for a new synchronization signal and the CRS of serving cell and/or neighbor cells. For example, the power offset between the new synchronization signal and CRS may be {−3, 0, 3, spare} dB.

In some embodiments, the new synchronization signal (e.g., efeMTC synchronization signal) may be enabled and/or configured semi-statically (e.g., by reserved bits in MIB, MIB-BR, SIB1-BR, or other SIBs). User equipment (UL), in certain embodiments, may utilize a efeMTC synchronization signal other than initial access. In some embodiments, higher layers may indicate the configuration of a efeMTC synchronization signal in signaling, and the configuration of a new synchronization signal may also be indicated during handover.

In some embodiments, the configuration of efeMTC synchronization signal may be considered a long-term property of the cell, for example, while the configuration of efeMTC periodic synchronization signal may be up to network implementation, a UE may detect the presence of the efeMTC periodic synchronization signal and may assume a same configuration for subsequent reacquisition attempts. For idle mode UEs, in certain embodiments, a change of configuration of a efeMTC periodic synchronization signal may be indicated by the change of system information (e.g., change of MIB, SIB1-BR, or other SIBs).

Figure 11:
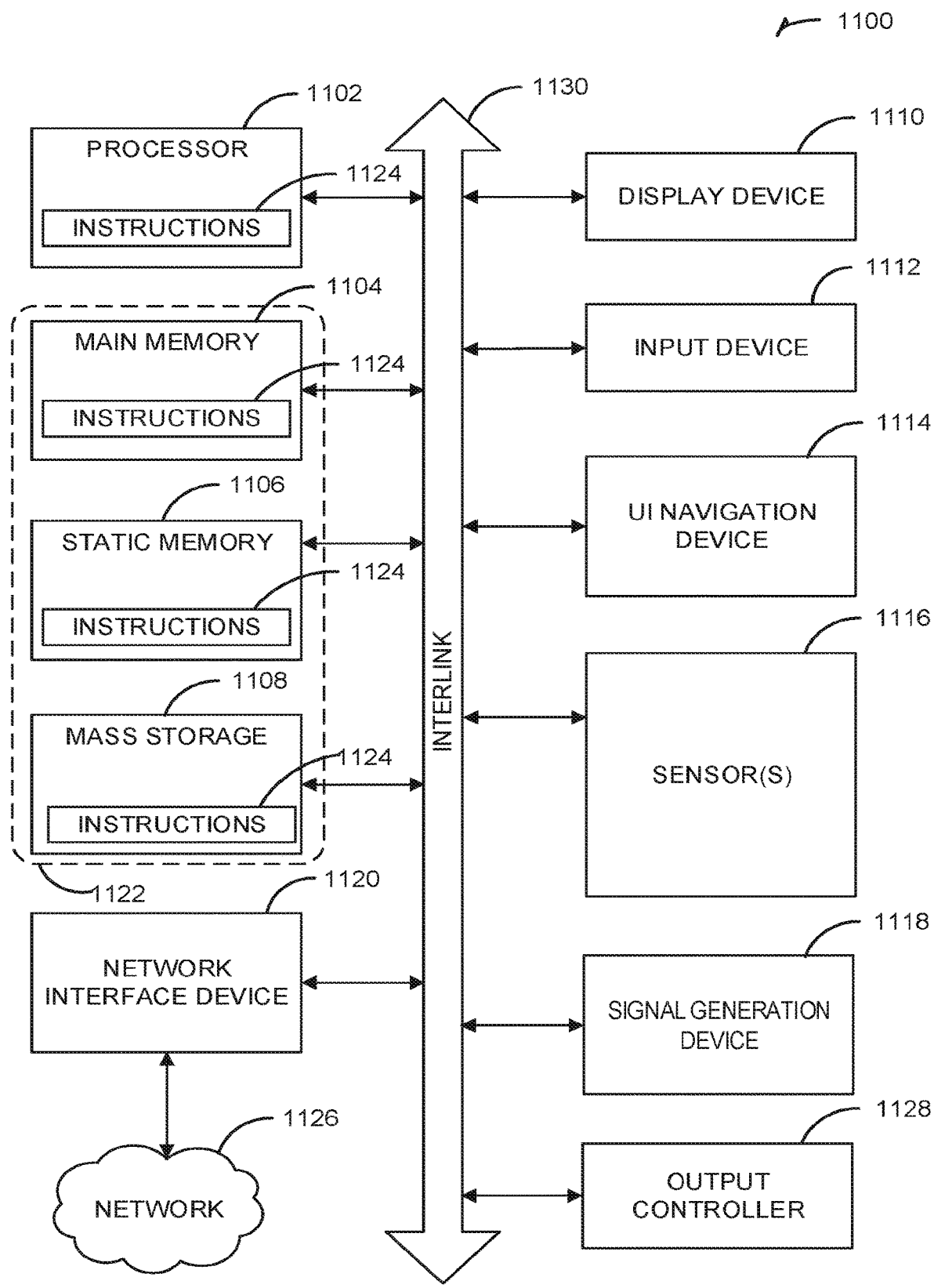
FIG. 11 illustrates a block diagram of an example machine, in accordance with some embodiments.

FIG. 11 illustrates a block diagram of an example machine 1100 upon which any one or more of the techniques (e.g., methodologies) discussed herein may be performed, for example, one or more efeMTC operations. Examples, as described herein, may include, or may operate by, logic or a number of components, or mechanisms in the machine 1100. Circuitry (e.g., processing circuitry) is a collection of circuits implemented in tangible entities of the machine 1100 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1100 follow.

In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1100 may include a hardware processor 1102 (e.g., a central processing unit (CPU), a graphics processing unit (GPU), a hardware processor core, or any combination thereof), a main memory 1104, a static memory (e.g., memory or storage for firmware, microcode, a basic-input-output (BIOS), unified extensible firmware interface (UEFI), etc.) 1106, and mass storage 1108 (e.g., hard drive, tape drive, flash storage, or other block devices) some or all of which may communicate with each other via an interlink (e.g., bus) 1130. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1108, a signal generation device 1118 (e.g., a speaker), a network interface device 1120, and one or more sensors 1116, such as a global positioning system (GPS) sensor, compass, accelerometer, or other sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1102, the main memory 1104, the static memory 1106, or the mass storage 1108 may be, or include, a machine readable medium 1122 on which is stored one or more sets of data structures or instructions 1124 (e.g., software) embodying or utilized by any one or more of the techniques or functions described herein. The instructions 1124 may also reside, completely or at least partially, within any of registers of the processor 1102, the main memory 1104, the static memory 1106, or the mass storage 1108 during execution thereof by the machine 1100. In an example, one or any combination of the hardware processor 1102, the main memory 1104, the static memory 1106, or the mass storage 1108 may constitute the machine readable media 1122. While the machine readable medium 1122 is illustrated as a single medium, the term "machine readable medium" may include a single medium or multiple media (e.g., a centralized or distributed database, and/or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1124 may be further transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®), IEEE 802.16 family of standards known as WiMax®), IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software. A transmission medium is a machine readable medium.

EXAMPLES

Although an aspect has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "aspect" merely for convenience and without intending to voluntarily limit the scope of this application to any single aspect or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

The following describes various examples of methods, machine-readable media, and systems (e.g., machines, devices, or other apparatus) discussed herein.

Example 1 is an apparatus of a Base Station (BS) configured for Even Further Enhanced Machine-Type Communication (efeMTC), the apparatus comprising: memory; and processing circuitry configured to: generate a length-x sequence for an efeMTC synchronization signal, the length-x sequence configured for repetition in frequency domain within 1 is missing parent: 6 physical resource blocks (PRB), wherein to generate the length-x sequence, the processing circuitry is configured to: select any one index of the set of root indices {1, 1 is missing parent: 2, . . . , 1 is missing parent: 63}, excluding the root indices 1 is missing parent: 25, 1 is missing parent: 29 and 1 is missing parent: 34, to correspond to a different physical-layer cell identity (PCID); encode RRC signaling to include, a System Information Block (SIB), the SIB comprising configuration information for transmission of the efeMTC synchronization signal; generate signaling to configure transceiver circuitry to transmit the length-x sequence as the efeMTC synchronization signal in frequency resources according to the SIB, wherein the memory is configured to store the length-x sequence.

Example 1 is an apparatus of a Base Station (BS) configured for Even Further Enhanced Machine-Type Communication (efeMTC), the apparatus comprising: memory; and processing circuitry configured to: generate a length-x sequence for an efeMTC synchronization signal, the length-x sequence configured for repetition in frequency domain within 6 physical resource blocks (PRB), wherein to generate the length-x sequence, the processing circuitry is configured to: select any one index of a set of root indices {1, 2, . . . , 63}, excluding root indices 25, 29 and 34, to correspond to a different physical-layer cell identity (PCID); encode radio resource control (RRC) signaling to include a System Information Block (SIB), the SIB comprising configuration information for transmission of the efeMTC synchronization signal; generate signaling to configure transceiver circuitry to transmit the length-x sequence as the efeMTC synchronization signal in frequency resources according to the SIB, wherein the memory is configured to store the length-x sequence.

In Example 2, the subject matter of Example 1 includes, wherein the length-x sequence is one of a length-12 sequence configured to repeat 6 times within the 6 PRBs, a length-24 sequence configured to repeat 3 times within the 6 PRBs, a length-32 sequence configured to repeat 2 times within the 6 PRBs, a length-63 sequence configured to repeat once within the 6 PRBs, or a length-72 sequence configured to repeat once within the 6 PRBs.

In Example 3, the subject matter of Example 2 includes, wherein the length-x sequence is one of a Zadoff-Chu sequence, a maximum length sequence (m-sequence), or Gold sequence.

In Example 4, the subject matter of Examples 1-3 includes, wherein the processing circuitry is configured to generate the length-x sequence based on a selection of a different scrambling code according to the PCID.

In Example 5, the subject matter of Examples 1-4 includes, wherein the processing circuitry is configured to further generate signaling to repeat a transmission of the efeMTC synchronization signal over a specified number of symbols in one or more subframes.

In Example 6, the subject matter of Examples 1-5 includes, wherein the processing circuitry: select a subset of root indices of the set of root indices {1, 2, . . . , 63}; and generate the length-x sequence based on the subset of root indices, wherein the nth root index of the subset of root indices corresponds to (PCID mod N)=n−1.

In Example 7, the subject matter of Example 6 includes, wherein the subset of root indices includes at least one root index having a cross correlation value with a legacy primary synchronization signal (PSS) sequence below a specified threshold value.

In Example 8, the subject matter of Examples 2-7 includes, wherein the configuration information for the efeMTC synchronization signal comprises one or more of an indication of a periodicity of the efeMTC synchronization signal, an indication of a duration of the efeMTC synchronization signal, an indication of PRBs for transmission of the efeMTC synchronization signal, or an indication of a ratio of an energy per resource element (EPRE) of the efeMTC synchronization signal to an EYRE of a channel reference signal (CRS) of a cell.

In Example 9, the subject matter of Examples 2-8 includes, wherein the PRBs for transmission of the efeMTC synchronization signal are predefined.

In Example 10, the subject matter of Examples 1-9 includes, wherein the processing circuitry is configured to quasi co-locate the efeMTC synchronization signal with one of a legacy primary synchronization signal (PSS) or a legacy secondary synchronization signal (SSS).

In Example 11, the subject matter of Examples 1-10 includes, wherein the processing circuitry is configured to quasi co-locate the efeMTC synchronization signal with a channel reference signal (CRS).

In Example 12, the subject matter of Examples 1-11 includes, wherein the configuration information for the efeMTC synchronization signal is defined by a higher layer.

In Example 13, the subject matter of Example 12 includes, wherein the processing circuitry is configured to encode the RRC signaling to include the SIB after decoding, from signaling received from the higher layer during a handover operation, the configuration information.

In Example 14, the subject matter of Examples 2-13 includes, wherein the processing circuitry is configured to configure the efeMTC synchronization signal semi-statically via reserved bits in one or more of a Master Information Block (MIB), the SIB or a system information (SI) message.

In Example 15, the subject matter of Examples 2-14 includes, wherein the processing circuitry is configured to configure the efeMTC synchronization signal for one or more of a re-synchronization operation or a radio resource management (RRM) measurement operation.

Example 16 is an apparatus of a user equipment (UE) configured for Even Further Enhanced Machine-Type Communication (efeMTC), the apparatus comprising: memory; and processing circuitry to configure the UE for a cell acquisition operation, wherein as part of the cell acquisition operation, the processing circuitry is configured to: decode radio resource control (RRC) signaling, received from a Base Station (BS), the RRC signaling including a System Information Block (SIB) comprising configuration information for reception of an efeMTC synchronization signal, the efeMTC synchronization signal comprising a length-x sequence configured for repetition in frequency domain within 6 physical resource blocks (PRB), wherein the length-x sequence is generated based on a root index of a set of root indices {1, 2, . . . , 63}, excluding root indices 25, 29, and 34, and wherein any one index of the set of root indices {1, 2, . . . , 63} corresponds to a different physical-layer cell identity (PCID); configure transceiver circuitry to receive the efeMTC synchronization signal, according to the configuration information; and decode the length-x sequence for use in synchronization and subsequent exchange of efeMTC signaling with the BS, and wherein the memory is configured to store the efeMTC synchronization signal.

In Example 17, the subject matter of Example 16 includes, wherein the length-x sequence is one of a length-12 sequence configured to repeat 6 times within the 6 PRBs, a length-24 sequence configured to repeat 3 times within the 6 PRBs, a length-32 sequence configured to repeat 2 times within the 6 PRBs, a length-63 sequence configured to repeat once within the 6 PRBs, or a length-72 sequence configured to repeat once within the 6 PRBs.

In Example 18, the subject matter of Examples 16-17 includes, wherein the processing circuitry is a baseband processor.

In Example 19, the subject matter of Examples 16-18 includes, wherein the apparatus further comprises two or more antennas and a transceiver, the two or more antennas and the transceiver configured to receive the RRC signaling and the efeMTC synchronization signal.

Example 20 is a computer-readable hardware storage device that stores instructions for execution by one or more processors of a Base Station (BS) configured for Even Further Enhanced Machine-Type Communication (efeMTC), the instructions to configure the one or more processors to: generate a length-x sequence for an efeMTC synchronization signal, the length-x sequence configured for repetition in frequency domain within 6 physical resource blocks (PRB), wherein to generate the length-x sequence, the instructions are to configure the one or more processors to: select any one index of a set of root indices {1, 2, . . . , 63}, excluding root indices 25, 29 and 34, to correspond to a different physical-layer cell identity (PCID); encode radio resource control (RRC) signaling to include, a System Information Block (SIB), the SIB comprising configuration information for transmission of the efeMTC synchronization signal; and generate signaling to configure transceiver circuitry to transmit the length-x sequence as the efeMTC synchronization signal in frequency resources according to the SIB.

In Example 21, the subject matter of Example 20 includes, wherein the length-x sequence is one of a length-12 sequence configured to repeat 6 times within the 6 PRBs, a length-24 sequence configured to repeat 3 times within the 6 PRBs, a length-32 sequence configured to repeat 2 times within the 6 PRBs, a length-63 sequence configured to repeat once within the 6 PRBs, or a length-72 sequence configured to repeat once within the 6 PRBs.

Example 22 is a computer-readable hardware storage device that stores instructions for execution by one or more processors of a user equipment (UE) configured for Even Further Enhanced Machine-Type Communication (efeMTC), the instructions to configure the one or more processors to: configure the UE for a cell acquisition operation, wherein as part of the cell acquisition operation, the instructions are to configure the one or more processors to: decode radio resource control (RRC) signaling, received from a Base Station (BS), the RRC signaling including a System Information Block (SIB) comprising configuration information for reception of an efeMTC synchronization signal, the efeMTC synchronization signal comprising a length-x sequence configured for repetition in frequency domain within 6 physical resource blocks (PRB), wherein the length-x sequence is generated based on a root index of a set of root indices $\{1, 2, \ldots, 63\}$, excluding root indices 25, 29, and 34, and wherein any one index of the set of root indices $\{1, 2, \ldots, 63\}$ corresponds to a different physical-layer cell identity (PCID); configure transceiver circuitry to receive the efeMTC synchronization signal, according to the configuration information; and decode the length-x sequence for use in synchronization and subsequent exchange of efeMTC signaling with the BS.

Example 23 is at least one machine-readable medium including instructions that, when executed by processing circuitry, cause the processing circuitry to perform operations to implement of any of Examples 1-22.

Example 24 is an apparatus comprising means to implement of any of Examples 1-22.

Example 25 is a system to implement of any of Examples 1-22.

Example 26 is a method to implement of any of Examples 1-22.

What is claimed is:

1. An apparatus, comprising:
    at least one processor configured to cause a user equipment (UE) to:
        receive, from a base station (BS), a configuration for a first synchronization signal additional to a primary synchronization signal (PSS) and a secondary synchronization signal (SSS) in a system information block (SIB), wherein the first synchronization signal utilizes a length-x sequence generated by the BS; and
        receive the first synchronization signal, wherein:
            the first synchronization signal occurs on consecutive symbols of a subframe, the first synchronization signal is repeated on a plurality of consecutive subframes, and resource elements of the consecutive symbols that correspond to cell-specific reference signals (CRS) remain unchanged.

2. The apparatus of claim 1, wherein the first synchronization signal is not present in one or more subframe including one or more PSS or SSS.

3. The apparatus of claim 1, wherein the length-x sequence is initialized by a cell ID.

4. The apparatus of claim 3, wherein the length-x sequence is further initialized by information related to an update of one or more master information block (MIB) or SIB.

5. The apparatus of claim 1, wherein the length-x sequence uses an orthogonal cover code.

6. The apparatus of claim 1, wherein particular subframes are excluded from the plurality of consecutive subframes on which the first synchronization signal is repeated.

7. The apparatus of claim 1, wherein the length-x sequence includes one or more m-sequence or gold sequence.

8. A wireless device, comprising:
    wireless communication circuitry; and
    at least one processor coupled to the wireless communication circuitry and configured to cause the wireless device to:
        receive, from a base station (BS), a configuration for a first synchronization signal additional to a primary synchronization signal (PSS) and a secondary synchronization signal (SSS) in a system information block (SIB), wherein the first synchronization signal utilizes a length-x sequence generated by the BS; and
        receive the first synchronization signal, wherein:
            the first synchronization signal occurs on consecutive symbols of a subframe, the first synchronization signal is repeated on a plurality of consecutive subframes, and resource elements of the consecutive symbols that correspond to cell-specific reference signals (CRS) remain unchanged.

9. The wireless device of claim 8, wherein the length-x sequence is initialized by a cell ID.

10. The wireless device of claim 9, wherein the length-x sequence is further initialized by information related to an update of one or more master information block (MIB) or SIB.

11. The wireless device of claim 8, wherein the length-x sequence uses an orthogonal cover code.

12. The wireless device of claim 8, wherein particular subframes are excluded from the plurality of consecutive subframes on which the first synchronization signal is repeated.

13. The wireless device of claim 8, wherein the length-x sequence includes one or more m-sequence or gold sequence.

14. An apparatus, comprising:
    at least one processor configured to cause a base station (BS) to:
        transmit a configuration for a first synchronization signal additional to a primary synchronization signal (PSS) and a secondary synchronization signal (SSS) in a system information block;
        generate a length-x sequence for the first synchronization signal,
        transmit the first synchronization signal on consecutive symbols of a subframe, wherein the first synchronization signal is repeated on a plurality of consecutive subframes, and wherein resource elements of the consecutive symbols that correspond to cell-specific reference signals (CRS) remain unchanged.

15. The apparatus of claim 14, wherein the first synchronization signal is dropped in one or more subframe including one or more PSS or SSS.

16. The apparatus of claim 14, wherein the length-x sequence is initialized by a cell ID.

17. The apparatus of claim 14, wherein the length-x sequence uses an orthogonal cover code.

18. The apparatus of claim 14, wherein particular subframes are excluded from the plurality of consecutive subframes on which the first synchronization signal is repeated.

19. The apparatus of claim 14, wherein the length-x sequence includes one or more m-sequence or gold sequence.

20. The apparatus of claim 14, wherein the length-x sequence is initialized by information related to an update of one or more of master information block (MIB) or SIB.

* * * * *